United States Patent [19]

Robbins et al.

[11] Patent Number: 4,899,214
[45] Date of Patent: Feb. 6, 1990

[54] LOW COST COLOR SCANNER

[75] Inventors: Daniel H. Robbins, Rochester; John S. Wirtz, Henrietta; Juergen Lein, West Henrietta; Michael A. Brookmire, Pittsford, all of N.Y.

[73] Assignee: Itek Graphic Corp., Waltham, Mass.

[21] Appl. No.: 241,101

[22] Filed: Sep. 2, 1988

[51] Int. Cl.⁴ .......................... H04N 1/04; H04N 1/10
[52] U.S. Cl. ...................................... 358/75; 358/496; 358/401
[58] Field of Search ................. 358/75, 293, 285, 280, 358/400, 401, 474, 475, 494, 496

[56] References Cited

U.S. PATENT DOCUMENTS

| | | | |
|---|---|---|---|
| 3,646,262 | 2/1972 | Moe | 358/283 |
| 3,725,574 | 4/1973 | Gast. | |
| 3,997,911 | 12/1976 | Perriman | 358/75 |
| 4,051,536 | 9/1977 | Roetling | 358/283 |
| 4,149,195 | 4/1979 | Gast | 358/283 |
| 4,318,597 | 3/1982 | Kotani | 355/1 |
| 4,348,593 | 9/1982 | Seachman | 358/293 |
| 4,350,996 | 9/1982 | Rosenfeld | 358/75 |
| 4,353,628 | 10/1982 | Berman | 354/5 |
| 4,365,275 | 12/1982 | Berman | 358/283 |
| 4,375,647 | 3/1983 | Mir | 358/75 |
| 4,376,282 | 3/1983 | Kotani | 346/107 R |
| 4,378,149 | 3/1983 | Ebner. | |
| 4,456,924 | 6/1984 | Roesnfeld | 358/75 |
| 4,499,489 | 2/1985 | Gall | 358/75 |
| 4,514,100 | 4/1985 | LaSpesa. | |
| 4,564,859 | 1/1986 | Knop | 358/75 |
| 4,571,602 | 2/1986 | DeSchamphelaere | 364/160 |
| 4,583,127 | 4/1986 | Kurata et al. | 358/496 |
| 4,641,357 | 2/1987 | Satoh | 358/285 |
| 4,670,779 | 6/1987 | Nagano | 358/75 |
| 4,729,016 | 3/1988 | Alkofer | 358/75 |
| 4,750,211 | 6/1988 | Wray | 358/280 |
| 4,754,325 | 6/1988 | Ishida et al. | 358/75 |
| 4,764,807 | 8/1988 | Kimura | 358/75 |
| 4,774,591 | 9/1988 | Matsunawa | 358/285 |

FOREIGN PATENT DOCUMENTS

| | | |
|---|---|---|
| 0112518 | 4/1984 | European Pat. Off.. |
| 2527894 | 3/1977 | Fed. Rep. of Germany. |
| 0195066 | 8/1986 | Japan. |
| 0104360 | 5/1987 | Japan. |
| 0200969 | 9/1987 | Japan. |
| 0262565 | 11/1987 | Japan. |
| 0250967 | 10/1988 | Japan. |

OTHER PUBLICATIONS

"Product Update: Color Scanners", Graphic Arts Monthly, Mar. 1987, p. 50.

Primary Examiner—Howard W. Britton
Assistant Examiner—Jerome Grant, II
Attorney, Agent, or Firm—Morgan & Finnegan

[57] ABSTRACT

A color scanner is provided having a commonly mounted and driven original scanning table and LED dot generator exposure source. Scanning is accomplished by illuminating a strip of the original artwork with high intensity fluorescent light and detecting the illuminated strip through a linear scanning aperture, lens and color filter wheel using a charge coupled device ("CCD") linear detector. Original artwork is held by vacuum against the flat original artwork receiving surface and photosensitive material is automatically loaded and held by vacuum onto the surface of a rotating exposure drum mounted parallel to the direction of travel of the LED dot generator exposure source, and the exposed halftone film is automatically removed from the drum surface and loaded into a transfer cartridge. Advantageously, multiple linear scans may be averaged in order to reduce color fringe effects. As a further advantage of the present invention photosensitive material is loaded and unloaded from the exposure drum in daylight operation.

20 Claims, 7 Drawing Sheets

LOW COST COLOR SCANNER

TECHNICAL FIELD

The present invention relates to color separation scanners and, more specifically, to a low cost color scanner including a high resolution LED array.

BACKGROUND AND OBJECTS OF THE PRESENT INVENTION

In multiple color printing it is necessary to produce halftone separation images to be used in making printing plates corresponding to each color ink to be printed. In a traditional four color printing process red, green and blue halftone separations are used to make cyan, magenta and yellow printers, respectively, and a black halftone separation is used to make a black printer.

Halftone separations may be produced on a camera by exposing original color artwork through color separation filters and appropriate halftone screens having the desired screen angles and screen pitch. This method permits relatively inexpensive production of halftone separations, but is tedious, time consuming, requires extensive training and is subject to numerous operator errors. With the advent of reliable electronic scanners, halftone separations for multiple color printing are rarely, if ever, produced on a camera.

Today, it is common to send original artwork to a color separation house which, for a fee, produces color separations using an electronic color scanner. The color scanner typically includes a rotating scanning drum for analyzing original artwork and an electronic dot generator for exposing halftones. In operation, the color scanner scans original color artwork to obtain red, green and blue channel information, processes the information, and electronically exposes cyan, magenta, yellow and black halftone separations. Available electronic color scanners typically utilize a laser dot generator to expose the halftone separations onto film wrapped around a rotating exposure drum. Unfortunately, electronic color scanners are very complex and require substantial training and experience to operate. Electronic color scanners are also very expensive, which makes them economically unfeasible for most printers interested in producing color halftone separations, resulting in the common practice to contract this service to a color separation house.

Therefore, it is one object of the invention to provide a relatively inexpensive color separation scanner for producing halftone color separations.

It is a further object of the present invention to provide a low cost color scanner that is relatively simple to operate.

It is another object of the present invention to provide a low cost color scanner with an electronic dot generator not including a laser light source.

These and other highly desirable and unusual results are accomplished by the present invention in a low cost color scanner structure that is relatively simple to operate and which achieves quality halftone separations.

Objects and advantages of the invention are set forth in part herein and in part will be readily appreciated herefrom, or may be learned by practice with the invention, the same being realized and attained by means of the instrumentalities and combinations pointed out in the appended claims.

SUMMARY OF THE INVENTION

In accordance with the invention, a relatively low cost color separation scanner is provided. A moving scanning table movably supports an original artwork surface beneath an illumination source. The scanning table also movably supports an LED dot generator exposure source for producing a halftone separation image on a sheet of film disposed on the surface of a rotating drum mounted parallel to the direction of travel of the scanning table and LED dot generator exposure source. Automated loading and unloading of film in daylight are also provided.

In the preferred embodiment, two high intensity fluorescent bulbs extend across the width of the original artwork surface to illuminate a piece of original artwork placed thereon. Preferably, original artwork is held by vacuum against the original artwork surface. A linear strip of light reflected from the original artwork passes through a linear aperture and is reflected by a mirror through an infrared filter, a lens and a color filter wheel to a charge coupled device ("CCD") linear detector. The color filter wheel preferably includes four sets of alternating red, green and blue filters and is driven by a motor common to the rotating drum. The scanning table surface is also provided with a white calibration strip and a movable neutral density ("ND") filter, which may be disposed in the optical path for calibration purposes. A base supports both the scanning table and the rotating drum.

The dot generator exposure source preferably consists of a monolithic chip LED matrix array and associated optics for imaging the array onto the drum surface to produce a halftone separation image.

The rotating drum is mounted parallel to the direction of travel of the dot generator exposure source and is provided with automatic, daylight operable film loading and unloading mechanisms. The drum itself includes a film lead edge notch or groove extending axially across the surface of the drum with a lead edge vacuum channel disposed in and extending substantially the entire length of the lead edge notch. The drum surface also includes a peripheral vacuum channel having a pair of radial channel portions around substantially the entire circumference of the drum and a pair of axial channel portions substantially perpendicular to and connecting the radial circumferential channels. The area of the drum surface disposed within the peripheral channel is slightly less than the area of the predetermined size of film to be exposed. The lead edge vacuum channel and peripheral vacuum channel are connected to separately controlled vacuum sources, although this may consist of a single vacuum pump and two separately controlled solenoid valves. Apart from the lead edge notch and the peripheral channel, the drum surface is substantially smooth.

Film is provided in a two-part film supply having a film cassette and an associated light-tight buffer box, thereby permitting daylight loading of the scanner with film. A pair of film entry guides urge film withdrawn from the two part film supply mechanism toward the exposure drum, and a cutting knife cuts a predetermined length of film withdrawn from the two part film supply. A lead edge blow and a pair of film exit guides are provided for guiding exposed film to be removed from the drum surface to a pair of nip rollers and a transfer cartridge. A pair of pressure rollers selectively engage the drum surface or may be moved out of contact therewith.

In operation, original artwork is placed on the scanning table surface, appropriate parameters, e.g. the color halftone to be exposed, are entered by the user on a user interface display, and the sequence of scanner operations is commenced.

To load the film, the lead edge notch on the drum is indexed and the drum is slowly rotated, if necessary, until the lead edge notch is adjacent the output end of the film entry guides. Film is withdrawn from the two-part film supply and guided by the film entry guides until the film lead edge is disposed in or adjacent the lead edge notch. Vacuum is then applied to the lead edge vacuum channel to hold the film lead edge in the lead edge notch. The pressure rollers are lowered against the drum surface, vacuum is applied to the peripheral vacuum channel, and the drum is rotated slowly to maintain the film under tension until a predetermined length of film has been withdrawn from the two-part film supply. The drum and film drive are stopped, the film is cut, and the drum is rotated through several revolutions to completely wrap the film around the drum in engagement with the peripheral channel flush with the drum surface. The pressure rollers are moved away from the drum surface and the drum, with the film loaded onto the surface thereof, is accelerated to high speed for scanning exposure. In the preferred embodiment, vacuum is also applied to a scanning table groove to securely hold the original artwork against the original artwork surface.

After the drum is loaded with film and brought up to scanning speed, the scanning table is advanced. Scanning is commenced when a scanning index mark associated with the lead edge of original artwork reaches the scanning illumination source. During scanning, the scanning table advances slowly and linear strips of reflected light from the color original are alternately detected through the red, green and blue color filters. Preferably, scanned readings from one full color filter wheel revolution are averaged for each color and correspond to one scan line to be exposed. By way of example, all readings through the four red filters are averaged to obtain red data used to determine the corresponding exposure data for one scan line. This advantageously reduces color fringe effects and noise.

As the scanning table advances, the LED dot generator exposure source supported thereon is advanced axially adjacent the surface of the rotating drum. The LED array is activated in response to processed signals from the CCD linear detector, with the image of the illuminated LED array being focussed onto the drum surface to expose the desired halftone separation. Since the LED exposure source scans at the same rate of movement as the scanning table to expose the halftone image line by line corresponding to the linear scans of the original, relatively little memory is required. Advantageously, this contributes to the reduced cost of the scanner.

After exposure of the halftone separation, the drum is slowed and rotated slowly until the lead edge notch is disposed adjacent the film exit guides. The pressure rollers are again lowered to the drum surface, vacuum is terminated, and positive airflow is provided to the lead edge blow to ensure that the film lead edge, now released from the drum, is directed between the film exit guides. The drum is rotated slowly to drive the exposed film between the exit guides to a pair of nip rollers, which drive the exposed film into a transfer cartridge for transport to a film processor.

The foregoing operation is repeated for each halftone separation to be produced, although it is contemplated that the transfer cartridge could be adapted to receive and hold up to four separations prior to transport.

A separate calibration step may be performed in which the white calibration standard is disposed in the scanning aperture and a white calibration reading is taken. The ND filter may then be interposed to obtain a dark reading. Of course, these calibration steps could be performed either as a separate calibration procedure or at the beginning of a scan.

Thus, the present invention advantageously provides a relatively low cost and easy to operate color scanner. Cost is reduced by taking advantage of relatively inexpensive LED technology to eliminate any need for a complex laser exposure system. Cost is further reduced by taking advantage of a CCD linear detector in combination with ordinary color filters and high brightness fluorescent lighting. Cost is reduced still further by exposing the halftone substantially simultaneously with input scanning, thereby eliminating any need to store the scanned data. As a further advantage of the present invention only two synchronized motors are required. One motor drives both the color filter wheel and the rotating drum while the other remarkably controls the position of the commonly mounted scanning surface and LED dot generator exposure source. As a further advantage of the invention, substantially all scanning, film handling and exposure functions are automated for daylight operation so that relatively little user input and, hence, operator training are required.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate principles and preferred embodiments of the present invention, and may be briefly described as follows.

DETAILED DESCRIPTION OF THE PREFERRED EMBODIMENTS

Referring now to the drawings, there is shown a color scanner 10 in accordance with the present invention having an original artwork scanning section 12 and a halftone exposure section 14 with a light seal 16 therebetween. Scanning section 12 includes a moving scanning table 18 having a scanning surface illuminated by a light source 20, with a linear image strip reflected through a color filter wheel 22 and a lens 24 to a linear detector 26. Linear segments of the entire original are scanned sequentially as the scanning table moves under the illumination source. The exposure section includes a dot generator exposure source 28 fixed relative to the scanning table, which projects an exposure image onto a sheet of film disposed on a rotating exposure drum 30.

Figure 1:
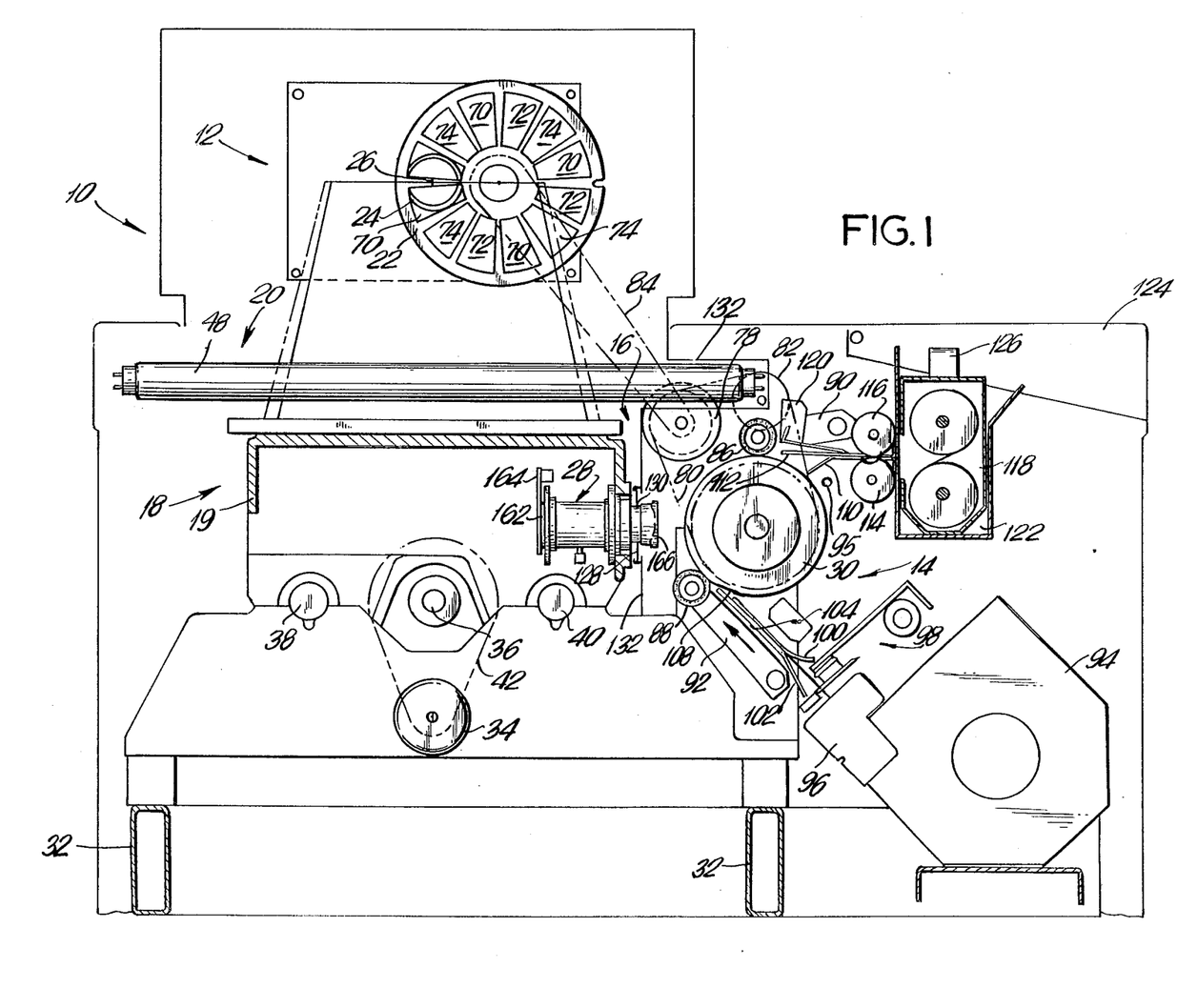
FIG. 1 is a general schematic front cross-section view of a color scanner constructed in accordance with the present invention.
Figure 2:
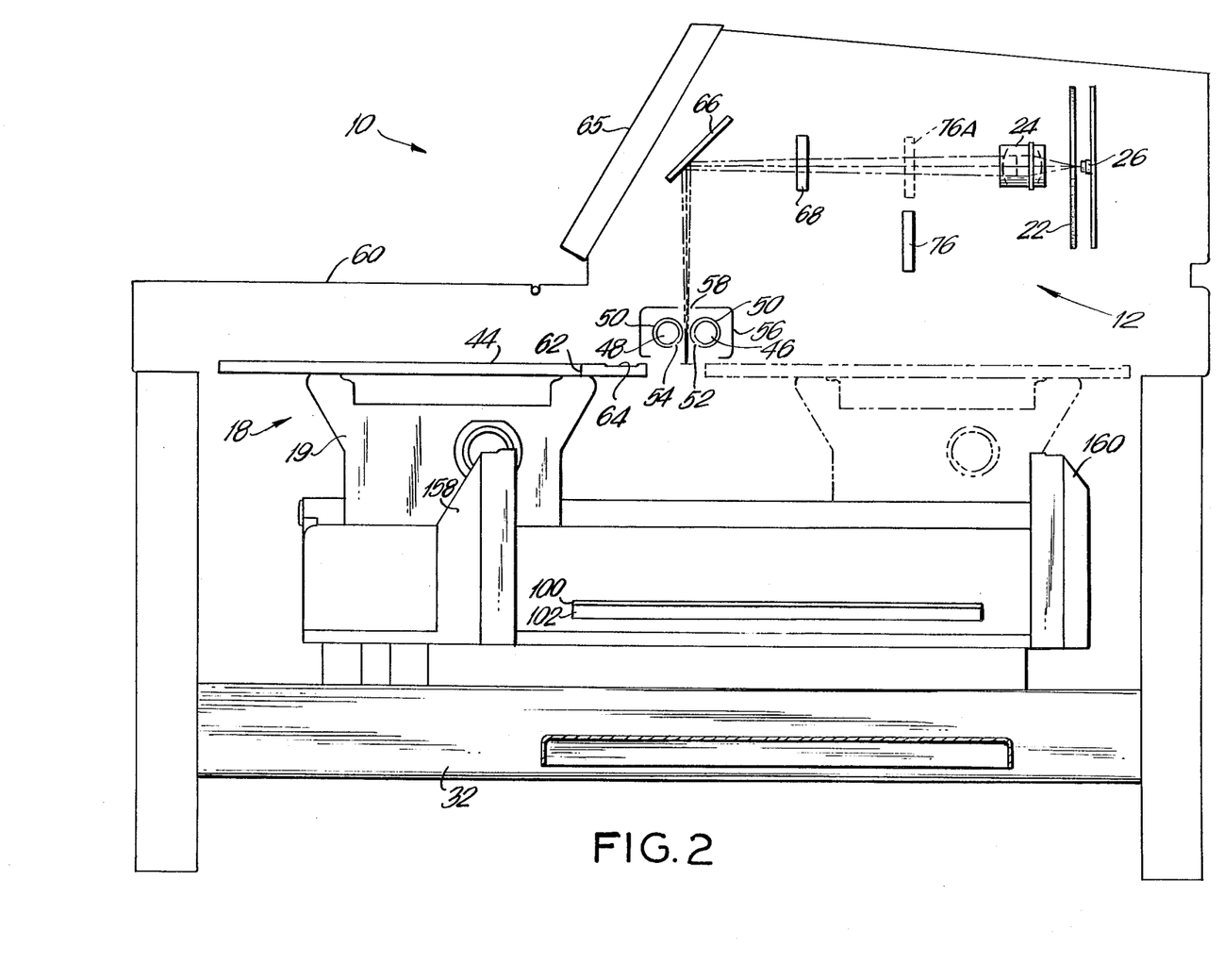
FIG. 2 is a partial side view of the scanner illustrating the scanning optics relative to scanning table position.
Figure 3:
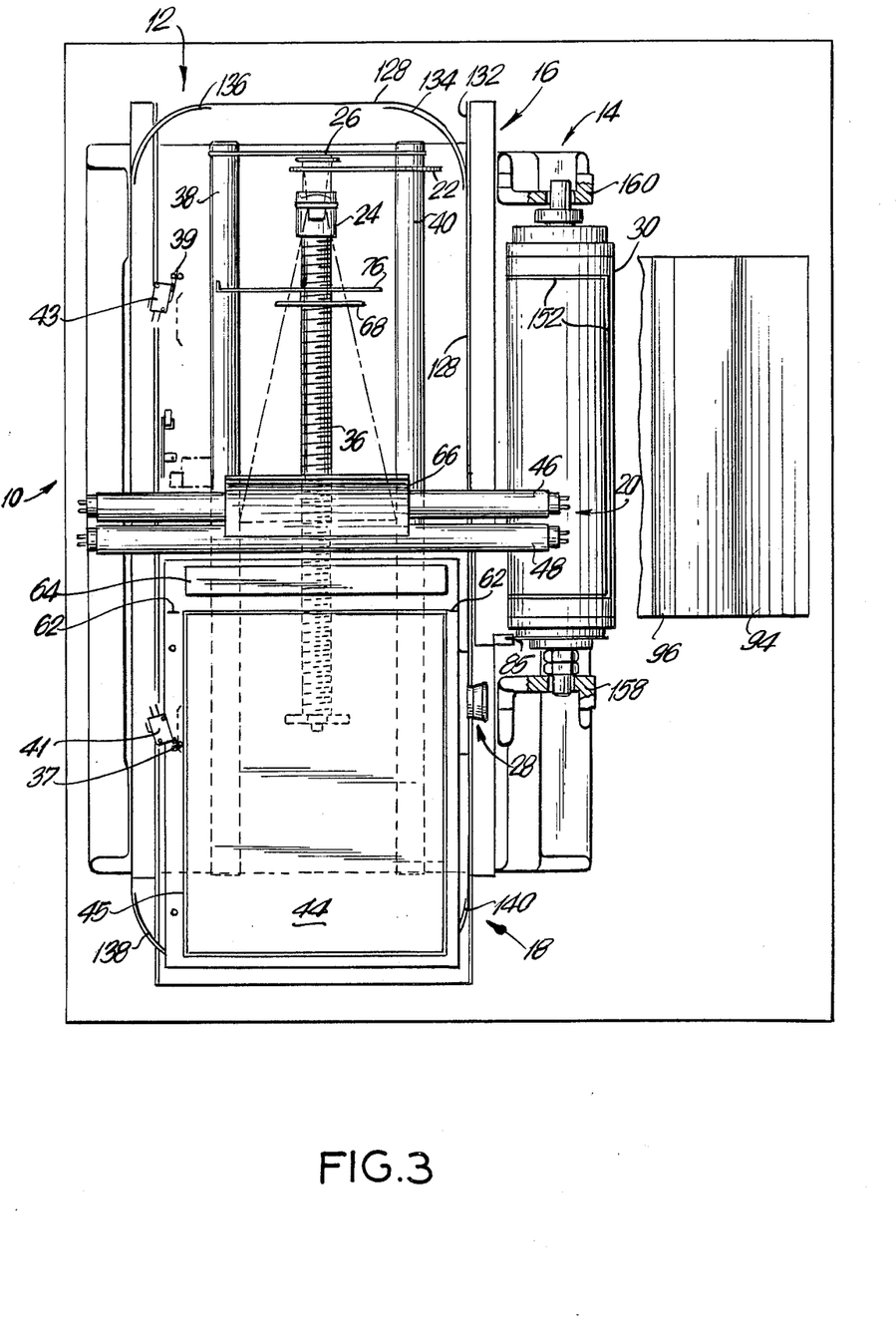
FIG. 3 is a partial top plan view of the scanner in accordance with the invention.

Referring more specifically to FIGS. 1 through 3, a frame 32 supports a scanning table motor 34, a threaded drive screw 36, and a pair of parallel scanning table guide rails 38, 40. Scanning table motor 34 drives a belt 42 which, in turn, drives threaded drive screw 36 (pulleys not shown). The scanning table motor 34 is a servo motor provided with a position/speed detector, such as a commercially available 1000 increment position and speed indicator. Threaded screw 36 is preferably a stainless steel screw having a pitch of at least about 40 threads per inch. Scanning table rails 38, 40 are preferably made of stainless steel.

Scanning table 18 includes a base 19 mounted on rails 38, 40 by friction bearings. A scanning table threaded member engages threaded drive screw 36 so that scanning table 18 traverses rails 38, 40 when threaded drive screw 36 is driven by scanning table motor 34. Scanning table base 19 supports a flat original artwork receiving surface 44 and the dot generator exposure source 28. A scanning table vacuum channel 45 holds the original artwork against the scanning table (see FIG. 3).

Light source 20 consists of two high brightness daylight fluorescent bulbs 46, 48, such as Sylvania daylight bulbs, provided with a coating 50 defining respective source apertures 52, 54 for illuminating a substantially linear region of the original artwork receiving surface disposed thereunder (see FIG. 2). As shown, the linear image strip to be detected is advantageously illuminated at approximately 45° from the scanning table surface with light from apertures 52, 54, and modulated light is reflected from the original artwork at approximately 90° to the scanning table surface. Bulbs 46, 48 are enclosed within a housing 56 to reduce stray illumination. An image aperture 58 is provided through housing 56 extending across scanning table 18. It is important that the light tight wall 132 surround that portion of bulbs 46, 48 extending beyond scanning table 18 toward exposing section 14 in order to prevent undesired light from entering exposure section 14 (see FIG. 1).

In FIG. 2, scanning table 18 is shown in the "start" or "home" position at the front of the scanner unit with original artwork surface 44 disposed beneath a hinged cover 60. Preferably, hinged cover 60 is made from dark tinted plexiglass. Scanning table 18 is also shown in phantom in FIG. 2 in the "stop" or "end" position at the rear of the scanner. The scanning table is driven along rails 38, 40 from the start to end position by motor driven threaded screw 36. Position sensors 37, 39 connected to motor cut-off switches 41, 43 are associated with the start and end positions to prevent the scanning table from accidentally being overdriven (see FIG. 3).

A "start scan" index mark 62 is also provided to indicate the location on scanning surface 44 where scanning of the original will commence. In the preferred embodiment, the original scanning surface measures approximately nine and one half by twelve inches corresponding to the approximate dimensions of scanning table vacuum channel 45. Scanning table 18 is also provided with a white calibration surface 64 near the lead edge of the table surface toward the rear of the scanner in relation to index mark 62. A display panel 65 is provided for user interaction.

As shown in FIG. 2, illumination reflected from original artwork on surface 44, is directed upward through scan aperture 58 and is reflected at approximately a 90° angle by a plane mirror 66 through an infrared filter 68, lens 24, and color filter wheel 22 to linear detector 26. Linear detector 26 is preferably a charge coupled device ("CCD"), such as a CCD element available from Toshiba under catalogue no. TCD 103D having 2,592 discrete elements. Referring again to FIG. 1, filter wheel 22 is provided with appropriate red, green and blue filters which alternately filter the image before detection by CCD 26. Preferably, three sets of alternating red filters 70, green filters 72, and blue filters 74 are provided. The red, green and blue filters may be Wratten No. 25, Wratten No. 58 and Wratten No. 47 filters, respectively. Infrared filter 68 is preferably an OCLI WBHM filter. Light bulbs 46, 48, filters 70, 72, 74 and the CCD detector 26 are all chosen to provide a substantially balanced response throughout the color spectrum. A movable neutral density ("ND") filter 76, preferably a 1.6 N.D. filter, is also provided and may be disposed in the optical path, as shown in phantom at 76A, for calibration purposes.

The exposure or output section 14 of scanner 10 includes a dot generator exposure source 28 mounted on scanning table base 19 and a rotating exposure drum 30 mounted closely in parallel to the path of illumination source 28 as scanning table 18 traverses from the start to end scan positions. A servo drum motor 78 drives a belt 80 which engages a pulley on rotating drum 30 and a pulley on a secondary motor 82. Servo motor 78 also drives a belt 84 connected to a pulley on filter wheel 22. Thus, motor 78 advantageously drives both drum 30 and filter wheel 22. Of course, the relative speeds of the drum and filter wheel may be adjusted by adjusting the size of the pulleys engaging belts 80, 84. A position encoder 85 is provided on drum 30 to indicate a zero point for each drum revolution and numerous increments of partial drum rotation (see FIG. 3). For accuracy, a 1000 increment position encoder is preferred. A phase lock loop is preferably provided to maintain synchronization between scanning table motor 34 and servo drum motor 78.

Figure 7:
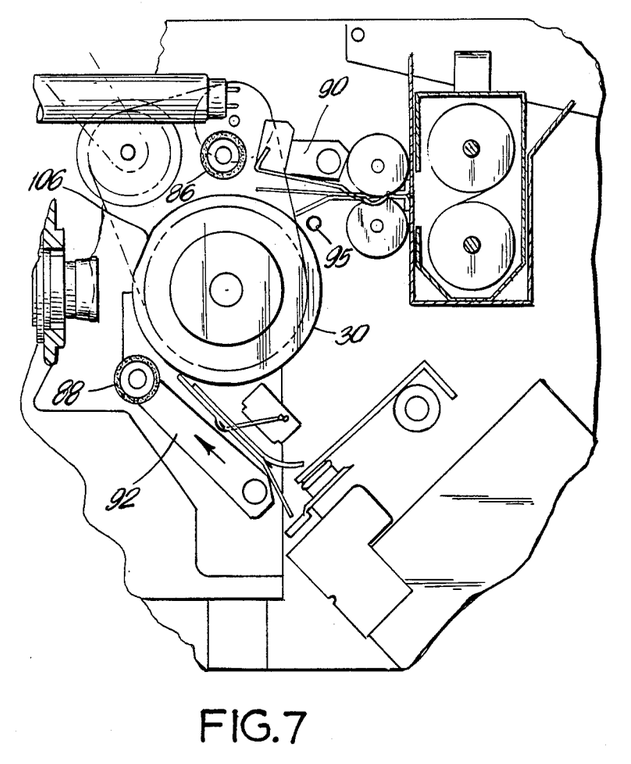
FIG. 7 is a partial view of the exposure drum shown in FIG. 1 with the pressure rollers raised away from the drum surface.

A pair of pressure rollers 86, 88 on movable arms 90, 92 are also provided. Movable arms 90, 92 assume a first position shown in FIG. 1 with pressure rollers 86, 88 engaging the drum surface and a second, scanning exposure position with rollers 86, 88 disposed away from the drum surface (see FIG. 7). Arms 90, 92 may be moved between the first and second arm positions by an appropriate motor-driven cam and gear mechanism (not shown). A lead edge blow mechanism 95 provides positive air pressure between the drum and lower exit guide 110 to enhance film release.

A supply of photosensitive material, i.e. film, is provided, and preferably consists of a two part film supply of the type disclosed in U.S. Pat. No. 4,248,512 entitled "Two-Part Photosensitive Media Replaceable Cassette Supply Device" including a disposable cartridge 94 and a detachable light tight drive box 96. A cutting knife mechanism 98, such as a rotary knife, is provided for cutting a length of film and film entry guides 100, 102 urge film removed from the two-part film supply device toward drum 30. An entry trip switch 104 detects the presence or absence of film between guides 100, 102. Drum 30 has a small lead edge notch or groove 106 with a lead edge vacuum channel 108 (see FIG. 5) for receiving and holding the lead edge of a sheet of photosensitive material, as more fully explained below in connection with the "Cycle of Operation". A pair of exit guides 110, 112 guide exposed film from drum 30 to a pair of driven nip rollers 114, 116. A trip switch 120 detects the presence or absence of the exposed film between exit guides 110, 112 to activate rollers 114, 116 and the transfer cartridge 118. Nip rollers 114, 116 drive the exposed sheet of film into a transfer cartridge 118, where the exposed photosensitive film is stored in a light tight manner for transport to a film processor. Preferably, transfer cartridge 118 is constructed and operated in accordance with U.S. patent application Ser. No. 06/920,193. Transfer cartridge 118 is disposed in a transfer cartridge well 122 beneath a light-tight hinged cover 124, and may be removed by opening cover 124 and lifting the transfer cartridge by handle 126.

It will readily be appreciated that, since dot generator exposure source 28 is mounted to scanning table 18 and axially traverses the length of drum 30, it is not possible to independently enclose the input and output sections in order to provide a light-tight exposure section. In practice, a slot 130 is provided in a wall 132 which separates the input and output sections to accommodate the lens barrel of the exposure source extending through the wall toward drum 30 (see FIGS. 1 and 4). Consequently, an important feature of the present invention is the creation of an effective light-tight seal at slot 130 between the scanning and exposure sections. This feature of the invention is best illustrated in and described with reference to FIGS. 1, 3 and 4.

FIG. 3 is a top plan view of the scanner illustrating the previously described structure having corresponding reference numerals. In addition, FIG. 3 shows a continuous light-tight belt 128 which provides a light tight seal between the input scanning section 12 and the exposure or output section 14 at the exposure source slot 130 in wall 132. In the preferred embodiment the light-tight belt is continuous and travels in a path defined by belt guides 134, 136, 138, 140. Of course, it is also contemplated that the light-tight belt might not be continuous, but could instead extend between and roll up around a pair of rollers. The light-tight belt has a cut-out opening surrounding the lens barrel 142 of dot generator exposure source 28. For ease of assembly, the light-tight belt may be seamed at the lens barrel.

Figure 4:
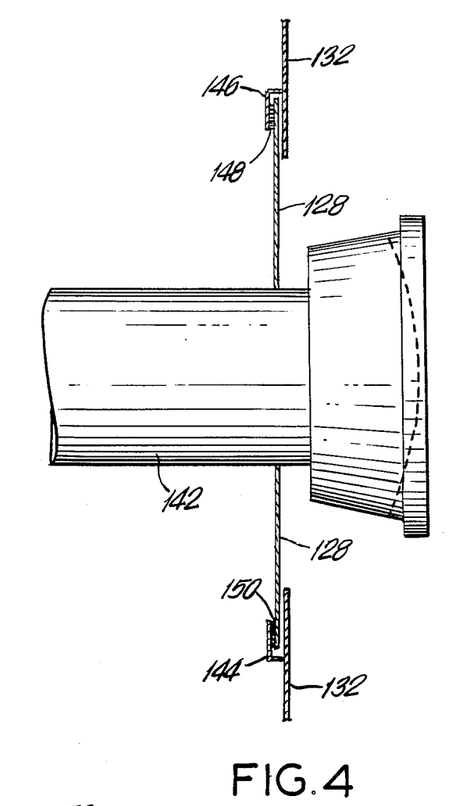
FIG. 4 is a partial cross-section view of the preferred embodiment of the invention shown in FIG. 1 illustrating the light seal between the scanning and exposure sections of the scanner.

FIG. 4 is a partial cross-section view of lens barrel slot 130 showing L-shaped track members 144, 146 which define a C-shaped track between one side of wall 132 and each track member. Belt 128 traverses the length of slot 130 in the C-shaped track, with belt sealing members 148, 150 on the inner surface of L-shaped members 144, 146 extending toward belt 128 to ensure that a light-tight seal is formed at the top and bottom edges of belt 128. The belt sealing members may be made of felt, brushes or other suitable light sealing materials. The belt itself is preferably constructed of a paper impregnated with light-sealing plastic or rubber, such as a black phenolic impregnated paper.

Figure 5:
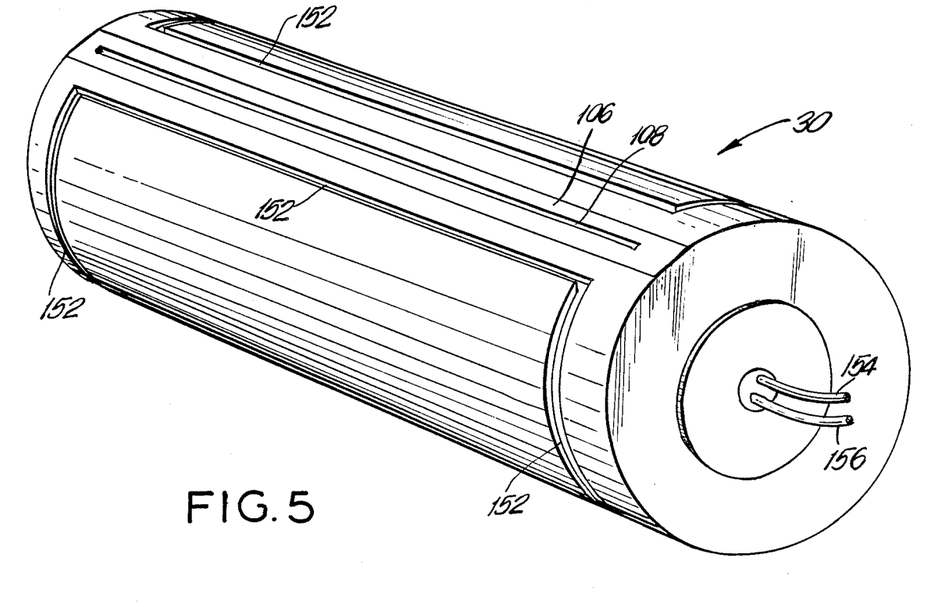
FIG. 5 is a perspective view of a rotating exposure drum in accordance with the preferred embodiment.

FIG. 5 is a perspective view of the preferred configuration of exposure drum utilized in the present invention. Drum 30 is substantially cylindrical having lead edge notch 106 with lead edge vacuum channel 108 disposed within the notch. A peripheral vacuum channel 152 is also provided having a width and length slightly smaller than the predetermined size of the sheet of film to be exposed. Vacuum hoses 154, 156 are led through openings in the non-rotating axial portion of the drum and are connected to the lead edge vacuum channel and the peripheral vacuum channel, respectively. The drum is axially mounted on drum mounts 158, 160 (see FIGS. 2 and 3) which in turn, are supported on frame 32. The drum is connected to drive belt 80 by a suitable pulley and/or gear mechanism (not shown).

Figure 9:
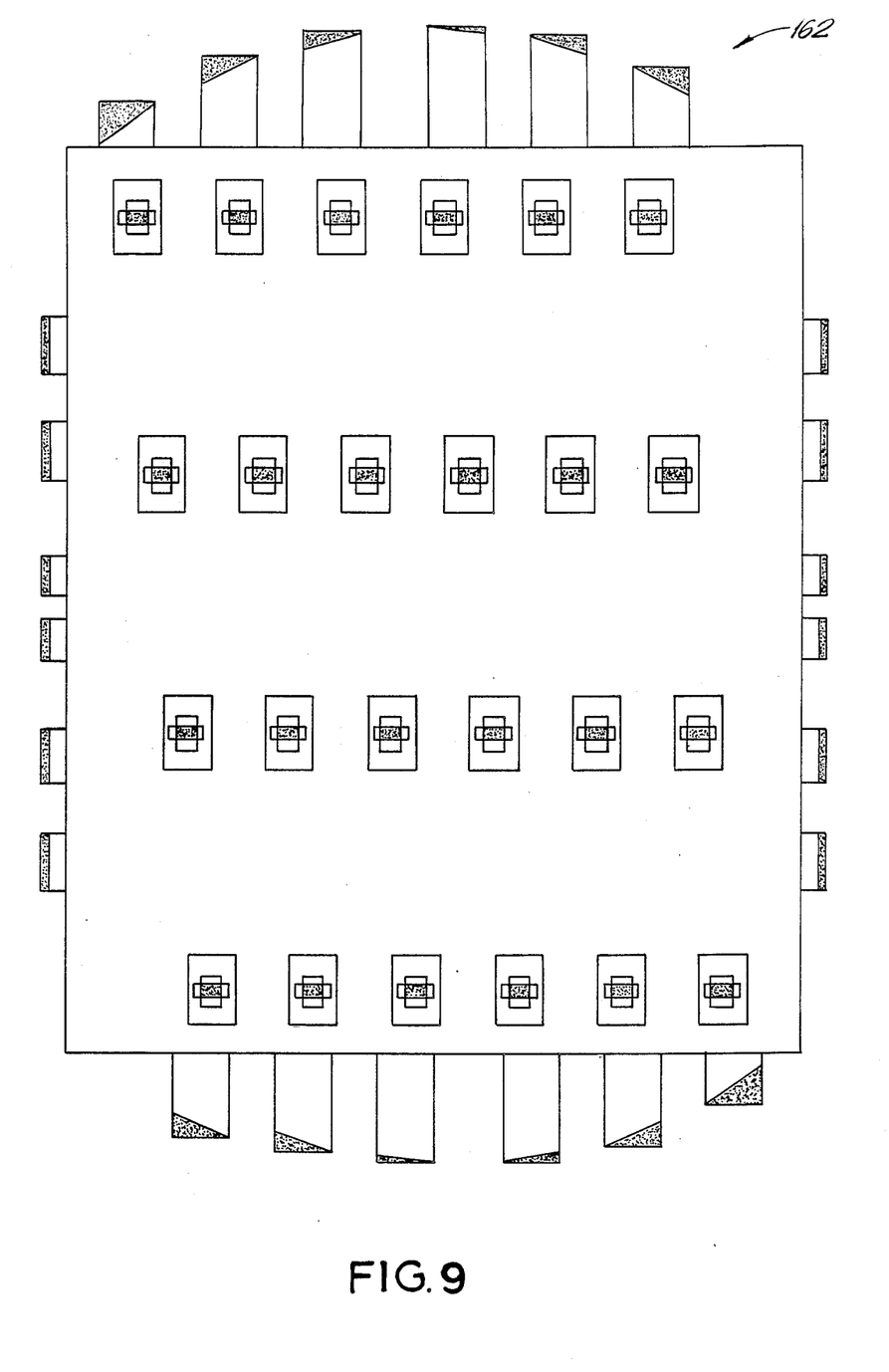
FIG. 9 is a plan view of the preferred LED array used in the preferred embodiment to exposure halftone images.

The preferred dot generator exposure source is a high resolution LED array 162 having four rows of six very small LED's, as illustrated in FIG. 9 and described in detail in co-pending application Ser. No. 07/241,100, which is hereby incorporated by reference. The LED array 162 is mounted on a substrate 164 and is imaged onto the drum surface by a suitable high quality lens 166 (see FIG. 1).

CYCLE OF OPERATION

In operation, the operator prepares an original artwork to be scanned, opens cover 60, and places the artwork on scanning surface 44 aligned with appropriate index markings. Cover 60 is closed, appropriate parameters, e.g. screen pitch and angle and the color separation to be produced are selected on input/output display 65, and the scanner is activated.

Upon activation, vacuum is applied to the scanning table channel to hold the original artwork flat against the scanning surface, and drum 30 is rotated at slow speed by secondary motor 82 until lead edge notch or groove 106 is disposed adjacent to the exit end of film guides 100, 102. The film supply mechanism is activated to drive the film lead edge through guides 100, 102 to notch 106. Vacuum is applied to lead edge vacuum channel 108 to secure the film lead edge in notch 106 and pressure rollers 86, 88 are lowered against the drum surface (see FIG. 1). The film supply mechanism continues to drive film out of cartridge 94 as servo drive motor 78 rotates the drum slowly to maintain tension on the film as the film wraps partially around drum 30. After the predetermined length of film is withdrawn from cassette 94, the film supply motor (not shown) and drum motor 78 are stopped and rotary knife 98 is activated to cut the film. After the film has been cut, secondary motor 82 is again activated to rotate drum 30 at slow speed with rollers 86, 88 pressing the film against the drum surface. At this point, vacuum is applied to peripheral vacuum channel 152 and the drum is rotated through several rotations to ensure that all air is evacuated from between the film and the drum. Thereafter, pressure rollers 86, 88 are raised away from the drum surface and secondary motor 82 is turned off. Servo drum motor 78 is again activated to bring the drum, bearing the photosensitive sheet of film, up to high rotating speed for scanning exposure (see FIG. 7).

Scanning table 18 is advanced by motor 34 until index mark 62 is disposed under scanning aperture 58, at which point scanning is commenced. Scanning table 18, rotating drum 30 and color filter wheel 22 are driven in synchronization throughout exposure scanning by servo motors 34, 78, with the dot generator exposure source 28 exposing the sheet of film on drum 30 as the scanning table advances. Of course, exposure will lag input scanning slightly in order to permit processing of scanned data to generate appropriate exposure signals.

During scanning, CCD detector 26 views and detects a linear strip on the original artwork approximately 0.00352 inches wide and having a length sufficient to extend across the width of the color original. A linear strip of the original is detected through each filter 70, 72, 74 as the table advances. As will be readily appreciated, however, the scanning table will have advanced slightly between the respective scans through one set of filters 70, 72, 74. To compensate for any color fringe effects which might otherwise result from slight misalignment of the red, green and blue images, color filter wheel 22 is preferably provided with four sets of color filters. In the preferred embodiment operated in accordance with the method described in co-pending United States Patent Application Ser. No. 07/240,758, the disclosure of which is hereby incorporated by reference, the four signals corresponding to any given color are effectively averaged to produce a single corresponding exposure signal. By way of example, all four detector signals corresponding to red filters 70 are averaged and taken into account to generate corresponding exposure values for a single line to be exposed on the halftone separation. Advantageously, this eliminates color fringe effects which might otherwise be introduced by the slight positional displacement of corresponding red, green and blue linear scans due to continuous scanning table movement. In addition, the multiple scan and averaging technique effectively compensates for dust interference and other aberational effects which may be introduced during a single scan.

Signals from the CCD detector 26 are processed in accordance with the foregoing application Ser. No. 07/240,758 to activate the individual LED's of LED array 162 as drum 30 bearing photosensitive film rotates at high speed. Advantageously, the dot generator exposure source 28 is advanced simultaneously with the scanning table, thereby eliminating the need for an additional synchronized motor to drive the exposure head axially across the drum surface.

Although the scanner scans the original for red, green and blue data as the scanning table is advanced, only one halftone separation is exposed during one cycle of movement of the scanning table from the first scanning table position to the second scanning table position. Thus, four passes with the scanning table are required to produce four halftone separations. In the preferred embodiment a minimum of scanned original artwork data is stored, with scanning and exposure being performed essentially "on the fly" for each halftone separation. Of course, it is also contemplated that memory could be provided to store the scanned information so that input scanning could be performed only on the first scan, with the input scanning elements being deactivated during subsequent passes to expose the remaining halftone separations from one set of scanned original data.

Figure 8:
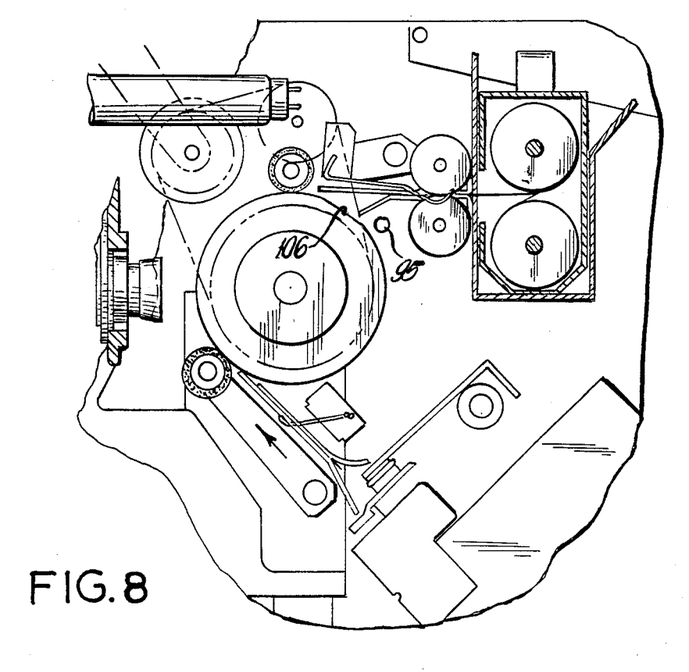
FIG. 8 is a partial elevation view of the exposure drum shown in FIG. 1 with the lead edge notch disposed adjacent the exit guides and the pressure rollers engaging the drum surface.

After exposure of the photosensitive film is complete, drum 30 is slowed by dynamically braking motor 78 and rotated at slow speed until the lead edge notch is disposed adjacent exit guides 110, 112, as shown in FIG. 8. The drum is stopped, pressure rollers 86, 88 are again lowered onto the drum surface, vacuum to lead edge vacuum channel 108 and peripheral vacuum channel 152 is terminated, and positive air pressure is applied to lead edge blow 95. The exposed film released from the lead edge notch is driven upward by lead edge blow 95 between guides 110, 112 and drum 30 is rotated slowly until a switch 113 indicates that the lead edge of the exposed film is in the nip of rollers 114, 116. The motor driven nip rollers 114, 116 take up the exposed sheet of film and drive the exposed film into transfer cartridge 118. The exposed film is wrapped up in light-tight fashion within the transfer cartridge and may be transported to an automatic processor for development. Alternatively, transfer cartridge 118 may be designed to receive and hold all four color separations and is left in place until four scans have been completed and four exposed halftones have been loaded into the transfer cartridge.

Figure 6:
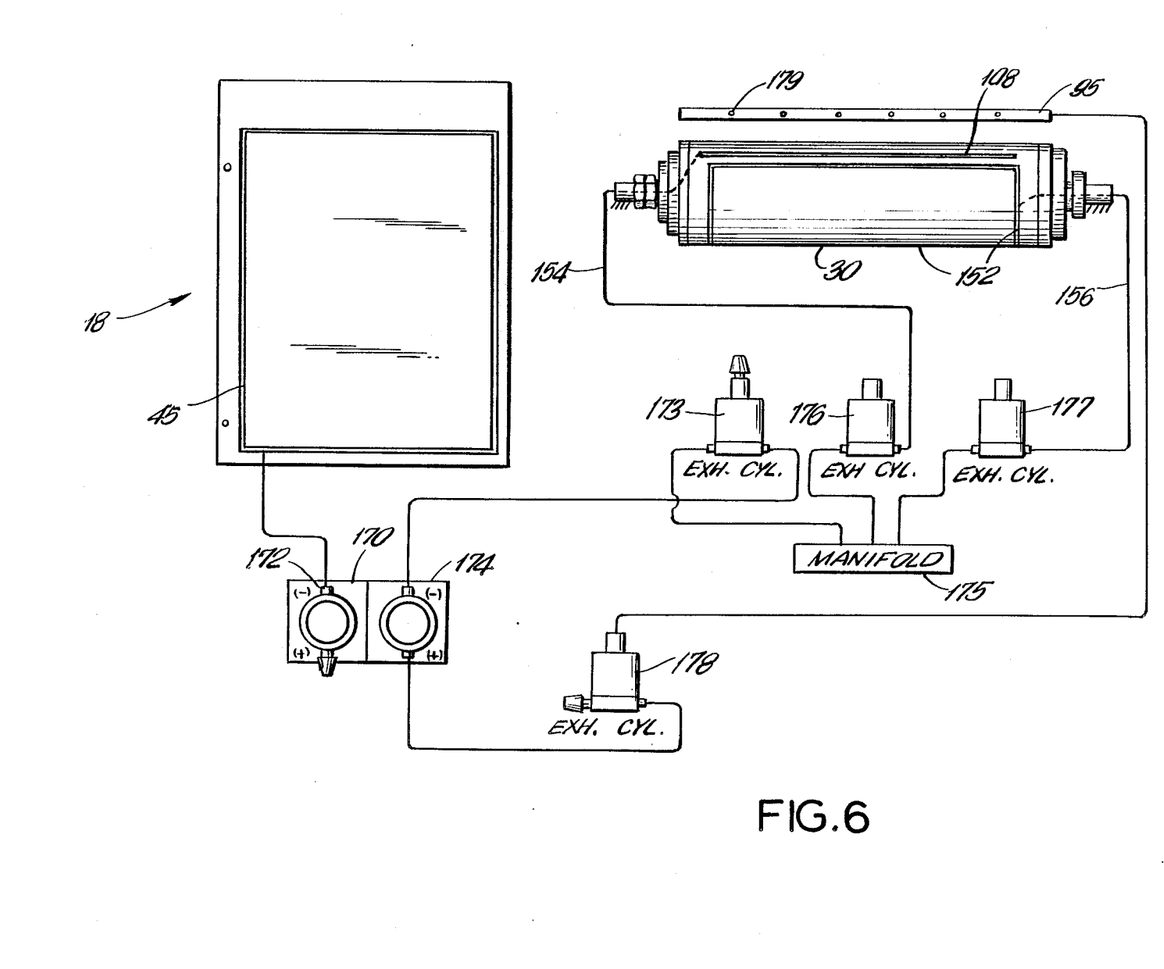
FIG. 6 is a general schematic layout of a vacuum system appropriate for use with the present invention.

FIG. 6 is a general schematic illustration of an appropriate vacuum system for controlling vacuum to the scanning table vacuum channel 45, the lead edge and peripheral vacuum channels 108, 152 on drum 30, and positive air pressure to the lead edge blow 95. A dual head vacuum pump 170 has one suction port 172 connected to scanning table vacuum channel 45. The second suction port 174 is connected to a first solenoid valve 173 which, in turn, is connected to a vacuum manifold 175. A second solenoid valve 176 is connected to manifold 175 and hose 154 which, in turn, is connected to lead edge vacuum channel 108. A third solenoid valve 177 is connected to manifold 175 and hose 156 which, in turn, is connected to peripheral vacuum channel 152. A fourth solenoid valve 178 is connected to one exhaust port of the dual head vacuum pump 170 and also to lead edge blow 95, here shown as a narrow diameter cylindrical pipe having several small holes 179 directed toward the drum surface between the drum surface and the lower exit film guide 110 (see FIG. 1). A vacuum pressure sensor 180 monitors the vacuum level at manifold 175, which is indicative of the vacuum furnished to the lead edge and peripheral vacuum channels.

Thus, suction port 170 supplies vacuum to scanning table vacuum channel 45 throughout substantially all scanner operations. Solenoid valve 173 selectively provides vacuum to manifold 175 when either the lead edge vacuum channel 108 or peripheral channel 152 are activated. Solenoid valve 173 is vented when neither of the lead edge or peripheral vacuum channels are activated. Solenoid valve 176 selectively provides vacuum from manifold 175 to lead edge vacuum channel 108 via hose 154 and solenoid valve 177 selectively provides vacuum to peripheral vacuum channel 152 via hose 156. Finally, solenoid valve 178 supplies positive air pressure to lead edge blow 95 when activated.

In operation, vacuum is supplied to the scanning table vacuum groove on commencement of operation and throughout scanning. When the film lead edge is disposed in lead edge notch 106, solenoid valves 173, 176 are activated to supply vacuum to lead edge vacuum channel 108 and rollers 86, 88 are lowered against the drum surface. Thereafter, vacuum is applied to peripheral vacuum channel 152 to hold the film against the drum surface during slow rotation of the drum with rollers 86, 88 lowered, high speed scanning rotation with the rollers raised away from the drum surface, and slowing of the drum after exposure. Vacuum pressure sensor 180 monitors the vacuum in manifold 175 to ensure sufficient vacuum is furnished to the lead edge and peripheral vacuum channels, particularly during high speed drum rotation.

After scanning is completed, the lead edge notch is disposed adjacent the exit guides, the pressure rollers are lowered against the drum surface, vacuum to the lead edge and peripheral vacuum channels is terminated by switching solenoid valves 173, 176, 177 "OFF", and positive air pressure to lead edge blow 95 is commenced by turning solenoid valve 178 "ON". After the exposed film is loaded into the transfer cartridge solenoid valve 178 is turned "OFF" and the scanning table is returned to the start position. The scanning table vacuum may be terminated if no further scanning is to occur or may remain active for further scanning.

A calibration step is also contemplated. Thus, for calibration the scanning table is advanced until white calibration standard 64 is disposed beneath illumination bulbs 46, 48 and linear scanning aperture 58. Readings are taken and electrical adjustments are made based on the white reading. Thereafter, movable neutral density filter 76 is interposed in the optical path and a low light level or "dark" calibration reading is taken. It is also contemplated that either or both of the foregoing calibration steps may be performed at the beginning of each scan or at the beginning of the first of four scans for a set of halftone separations.

As will be readily apparent, the foregoing apparatus and system advantageously provide a compact scanner that is substantially automatic and fully operable in daylight. The unique combination of elements, including a low cost LED dot generator exposure source commonly mounted to the scanning table, an inexpensive color filter wheel commonly driven by the drum motor, a CCD linear detector and a reliable automatic, daylight operable film handling mechanism, remarkably provide a relatively low cost color scanner. When operated in accordance with the method disclosed in copending application Ser. No. 07/240,758, the scanner is relatively easy to operate without extensive training. Thus, the present invention remarkably provides, for the first time, a relatively inexpensive and easy to operate color scanner which can be afforded and operated by printing shops as a cost effective alternative to sending all color separation work to a color separation house.

To the extent not already indicated, it will be understood that the invention in its broader aspects is not limited to the specific embodiments herein shown and described but departures may be made therefrom within the scope of the accompanying claims without departing from the principles of the invention and without sacrificing its chief advantages.

What is claimed is:

1. A color separation scanner comprising:
   a movable scanning table supporting an original artwork receiving surface and a dot generator exposure source;
   an illumination source for illuminating a linear portion of said artwork receiving surface, said linear strip portion being perpendicular to the direction of travel of said movable scanning table;
   a rotating color filter wheel including at least one set of alternating red, green and blue filters;
   a linear detector;
   optical means for projecting an image of said illuminated linear strip portion through said color filter wheel to said linear detector;
   a cylindrical exposure drum rotatably mounted substantially parallel to the direction of travel of said dot generator exposure source, said dot generator exposure source being imaged onto a portion of the surface of said cylindrical exposure drum, said cylindrical drum surface being configured and dimensioned to receive a sheet of photosensitive material;
   whereby, as said movable scanning table advances, original artwork placed on said original artwork receiving surface is sequentially scanned line by line by said linear detector through each of said red, green and blue filters on said rotating color filter wheel to produce detector signals, said dot generator exposure source being activated in response to said detector signals to expose a halftone separation image onto photosensitive material wrapped around the circumference of said cylindrical exposure drum.

2. The color scanner according to claim 1 further comprising a white calibration strip disposed on said artwork receiving surface, said white calibration strip providing a standardized white reading when disposed opposite said illumination source.

3. The color scanner according to claim 2 further comprising a movable neutral density filter, said neutral density filter being movable into the optical path of said image of said illuminated linear strip portion to provide a dark calibration reading.

4. The color scanner according to claim 1 wherein said movable scanning table is slidably mounted on at least one guide rail and engages a motor driven threaded drive screw.

5. The color scanner according to claim 4 further comprising a drum motor for driving said rotating exposure drum and said color filter wheel.

6. The color scanner according to claim 5 wherein said drum motor and said drive screw motor are synchronized.

7. The color scanner according to claim 1 wherein said illumination source further comprises a pair of high intensity fluorescent bulbs mounted perpendicular to the direction of travel of said scanning table.

8. The color scanner according to claim 7 wherein said bulbs are coated over substantially the entire circumferential surface thereof with a substantially internal reflective coating, said coating defining a substantially linear illumination aperture on each bulb facing said artwork receiving surface.

9. The color scanner according to claim 8 further comprising an illumination source housing enclosing said bulbs on all sides except the side facing said artwork receiving surface, said housing being provided with a linear scanning aperture in the housing side opposite said artwork receiving surface.

10. The color scanner according to claim 9 wherein said optical means further comprise a lens for reducing the size of the image from said linear scan aperture and directing said image through a filter on said rotating filter wheel to said linear detector.

11. The color scanner according to claim 1 wherein said optical means further comprise a linear scanning aperture disposed in the path of light reflected from said original artwork receiving surface and a lens to focus the image of said linear scanning aperture through a filter on said rotating color filter wheel onto said linear detector.

12. The color scanner according to claim 11 further comprising an infrared filter disposed in the optical path of the image of said linear scanning aperture.

13. The color scanner according to claim 11 further comprising a plane mirror to direct the image of said linear scanning aperture toward said lens.

14. The color scanner according to claim 11 further comprising photosensitive film handling means for automatically loading photosensitive material onto the surface of said exposure drum for exposure and for automatically removing the exposed photosensitive material from said drum surface after exposure.

15. A color separation scanner comprising:
a movable scanning table supporting an original artwork receiving surface and a dot generator exposure source, said scanning table having a scanning table vacuum channel for holding the original artwork against said original artwork receiving surface;
an illumination source for illuminating a linear strip portion of said artwork receiving surface, said linear strip portion being perpendicular to the direction of travel of said movable scanning table;
a rotating color filter wheel including at least one set of alternating red, green and blue filters;
a linear detector;
optical means for projecting an image of said illuminated linear strip portion through said color filter wheel to said linear detector;
a cylindrical exposure drum rotatably mounted substantially parallel to the direction of travel of said dot generator exposure source, said dot generator exposure source being imaged onto a portion of the surface of said cylindrical exposure drum, said cylindrical drum surface being configured and dimensioned to receive a sheet of photosensitive material;
photosensitive material handling means for automatically loading a sheet of photosensitive material onto said drum surface for exposure and unloading the photosensitive sheet from said drum surface after exposure;
whereby said photosensitive material handling means automatically loads a sheet of photosensitive material onto said drum surface so that, as said movable scanning table advances, original artwork placed on said original artwork receiving surface is sequentially scanned line by line by said linear detector through each of said red, green and blue filters on said rotating color filter wheel to produce detector signals,
said dot generator exposure source being activated in response to said detector signals to expose a halftone separation image onto the photosensitive material wrapped around said cylindrical exposure drum, said photosensitive material handling means automatically removing said photosensitive material bearing the latent halftone separation image from said drum surface after exposure.

16. The color scanner according to claim 15 wherein said photosensitive material handling means further comprise:
a supply of photosensitive material;
means for withdrawing a predetermined length of photosensitive material from said supply of photosensitive material;
entry guide means for guiding the lead edge of said predetermined length of photosensitive material toward an axial lead edge notch provided on said exposure drum;
lead edge vacuum means for securely holding the lead edge of said photosensitive material in said lead edge notch;
at least one movable pressure roller selectively engageable with said drum surface for conforming said sheet of photosensitive material to said drum surface as said drum rotates with the photosensitive material lead edge secured in said lead edge notch by said lead edge vacuum, said pressure roller being movable away from said drum surface for high speed scanning exposure;
a peripheral vacuum channel disposed on the surface of said cylindrical drum, the photosensitive material overlying said peripheral vacuum channel and being held against said drum surface by vacuum applied to said peripheral vacuum channel.

17. The color scanner according to claim 16 wherein said photosensitive material handling means further comprise:
exit guide means for guiding the exposed photosensitive material from said drum surface for development.

18. The color scanner according to claim 17 further comprising lead edge blow means for directing the lead edge of the exposed photosensitive material toward said exit guide means.

19. A method of operating a color scanner having a movable scanning table supporting an original artwork receiving surface and a dot generator exposure source, the artwork receiving surface having a scanning table vacuum channel; an illumination source for illuminating a linear strip portion of said artwork receiving surface, said linear strip portion being perpendicular to the direction of travel of said movable scanning table; a rotating color filter wheel including at least one set of alternating red, green and blue filters; a linear detector; optical means for projecting an image of said illuminated linear strip portion through said color filter wheel to said linear detector; a cylindrical exposure drum rotatably mounted substantially parallel to the direction of travel of said dot generator exposure source; photosensitive material handling means for automatically withdrawing a sheet of photosensitive material of predetermined length from a photosensitive material supply, loading the sheet of photosensitive material onto said drum surface for exposure and unloading said sheet from said drum surface after exposure;
the method comprising the steps of:
placing an original artwork on said original artwork receiving surface;
activating said scanning table vacuum to hold said original artwork on said original artwork receiving surface;
activating said photosensitive material handling means to withdraw a sheet of photosensitive material and load said photosensitive sheet onto said exposure drum;
rotating said exposure drum for scanning exposure;
activating said illumination source;
rotating said rotating filter wheel;
advancing said scanning table;
sequentially scanning linear strip portions of said original artwork surface through said filters with said linear detector to produce scanned readings as said scanning table advances;
activating said dot generator exposure source in response to said scanned readings to expose a halftone separation image onto the photosensitive material disposed on the surface of the rotating scanning drum as said scanning table advances and, after exposure;

activating said photosensitive material handling means to remove the exposed photosensitive material from said drum surface for processing.

20. The method according to claim 19 further comprising calibrating the color scanner prior to sequential scanning of linear strip portions by:
   disposing a white calibration standard in the path of said illumination source to obtain a white calibration reading; and
   disposing a neutral density filter in the optical path of the image of said white calibration standard to obtain a dark calibration reading.

* * * * *